US012597779B2

(12) United States Patent　　　　　(10) Patent No.: US 12,597,779 B2
Barraco et al.　　　　　　　　　　　　(45) Date of Patent: Apr. 7, 2026

(54) AIRCRAFT ELECTRICAL ENERGY SUPPLY NETWORK

(71) Applicant: SAFRAN HELICOPTER ENGINES, Bordes (FR)

(72) Inventors: Thomas Barraco, Moissy-Cramayel (FR); Thomas Klonowski, Moissy-Cramayel (FR); Vincent Poumarede, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/604,504

(22) PCT Filed: Apr. 23, 2020

(86) PCT No.: PCT/FR2020/000148
§ 371 (c)(1),
(2) Date: Oct. 18, 2021

(87) PCT Pub. No.: WO2020/217007
PCT Pub. Date: Oct. 29, 2020

(65) Prior Publication Data
US 2022/0204173 A1　　　Jun. 30, 2022

(30) Foreign Application Priority Data

Apr. 25, 2019　(FR) ...................................... 1904407

(51) Int. Cl.
*H02J 5/00*　　　　(2016.01)
*B64D 27/33*　　　(2024.01)
(Continued)

(52) U.S. Cl.
CPC ................ *H02J 5/00* (2013.01); *B64D 27/33* (2024.01); *B64D 27/357* (2024.01); *B64D 47/00* (2013.01); *H02J 3/32* (2013.01); *B64D 2221/00* (2013.01)

(58) Field of Classification Search
CPC ....................................................... H02J 5/00
See application file for complete search history.

(56) References Cited

U.S. PATENT DOCUMENTS 6,992,403 B1 *　1/2006　Raad ........................ F02C 7/275
　　　　　　　　　　　　　　　　　　　　　　290/10
7,936,086 B2 *　5/2011　Yue .......................... H02J 1/102
　　　　　　　　　　　　　　　　　　　　　　307/10.1

(Continued)

FOREIGN PATENT DOCUMENTS

EP　　　　2192681 A1　　6/2010
WO　　　2009052843 A1　　4/2009
WO　　　2017140706 A1　　8/2017

OTHER PUBLICATIONS

International Search Report mailed on Aug. 7, 2020, issued in corresponding International Patent Application No. PCT/FR2020/000148, filed on Apr. 23, 2020, and its English translation thereof, 2 pages.

(Continued)

*Primary Examiner* — Adi Amrany
(74) *Attorney, Agent, or Firm* — Christensen O'Connor Johnson Kindness PLLC

(57) ABSTRACT

An electrical energy supply network of an aircraft equipped with a plurality of electrical loads to be supplied includes at least two generators of a turbogenerator of the aircraft, each suitable for providing an electrical energy source, and at least one stator associated with a rectifier. The stators of the generators are mounted in parallel on at least two distribution buses designed to supply the plurality of electrical (Continued)

loads. The supply network also includes contactors suitable for electrically connecting or disconnecting the distribution buses from each other.

4 Claims, 4 Drawing Sheets

(51) Int. Cl.

| | | |
|---|---|---|
| *B64D 27/357* | (2024.01) | |
| *B64D 47/00* | (2006.01) | |
| *H02J 3/32* | (2006.01) | |

(56) References Cited

U.S. PATENT DOCUMENTS

| | | | | |
|---|---|---|---|---|
| 10,840,699 | B2 * | 11/2020 | Mokhberdoran | H02H 3/087 |
| 2003/0080718 | A1 * | 5/2003 | McDonald | H02M 3/156 |
| | | | | 323/282 |
| 2008/0174177 | A1 * | 7/2008 | Langlois | H02J 1/14 |
| | | | | 307/18 |
| 2009/0167097 | A1 * | 7/2009 | Seymour | H02J 3/381 |
| | | | | 307/113 |
| 2009/0228223 | A1 * | 9/2009 | Liu | G01R 31/008 |
| | | | | 361/62 |
| 2012/0104856 | A1 * | 5/2012 | Gottlieb | H02J 1/10 |
| | | | | 307/66 |
| 2013/0162035 | A1 * | 6/2013 | Sullivan | H02H 7/28 |
| | | | | 307/18 |
| 2013/0200691 | A1 * | 8/2013 | Crane | B63H 23/24 |
| | | | | 307/9.1 |
| 2013/0221926 | A1 * | 8/2013 | Furtner | H02J 7/0019 |
| | | | | 320/128 |
| 2015/0060601 | A1 * | 3/2015 | Nakagawa | B64C 13/505 |
| | | | | 244/99.2 |
| 2015/0102663 | A1 | 4/2015 | Brouwer et al. | |
| 2015/0165990 | A1 * | 6/2015 | Iwashima | B60R 16/03 |
| | | | | 307/9.1 |
| 2016/0134160 | A1 * | 5/2016 | Schultz | H02J 7/0019 |
| | | | | 307/77 |
| 2016/0156302 | A1 * | 6/2016 | Asai | H02P 27/08 |
| | | | | 318/255 |
| 2018/0272870 | A1 * | 9/2018 | Burkman | H02H 9/001 |
| 2018/0339790 | A1 * | 11/2018 | Huang | H02J 4/00 |
| 2019/0039715 | A1 * | 2/2019 | Jacquemoud-Collet | |
| | | | | H04L 12/40006 |
| 2019/0118960 | A1 * | 4/2019 | Izquierdo Gil | B64D 27/02 |
| 2019/0190251 | A1 * | 6/2019 | Corzine | H03K 17/687 |
| 2020/0144807 | A1 * | 5/2020 | Garrison | H02H 7/268 |
| 2021/0139154 | A1 * | 5/2021 | Klonowski | B64D 35/024 |
| 2022/0185497 | A1 * | 6/2022 | Barraco | B64D 47/00 |
| 2023/0378747 | A1 * | 11/2023 | Paakkunainen | H02J 1/102 |

OTHER PUBLICATIONS

Written Opinion of the International Searching Authority mailed on Oct. 29, 2020, issued in corresponding International Patent Application No. PCT/FR2020/000148, filed on Apr. 23, 2020, and its English translation thereof, 3 pages.

* cited by examiner

Fig. 4

AIRCRAFT ELECTRICAL ENERGY SUPPLY NETWORK

CROSS-REFERENCE TO RELATED APPLICATIONS

This application is a National Stage of International Application No. PCT/FR2020/000148, filed Apr. 23, 2020, which claims priority to French Patent Application No. 1904407, filed Apr. 25, 2019, the entire disclosures of which are hereby incorporated by reference.

TECHNICAL FIELD OF THE INVENTION

The present invention relates to the field of the electrical supply for an aircraft. It relates to an electrical energy supply network for an aircraft provided with a plurality of electrical loads to be supplied.

The present invention is used in particular in the context of electrical architectures integrating power sources comprising a gas turbine associated with a generator forming a turbogenerator, and loads or consumers of electrical energy such as electrical thrusters.

The present invention is not directed to any particular aircraft and can be applied to both stationary wing aircraft and rotary wing aircraft of the helicopter or multicopter type.

BACKGROUND

The prior art comprises, but is not limited to, the documents WO-A1-2017/140706, US-A1-2015/102663, WO-A1-2009/052843, EP-A1-2 192 681.

In a known way, the propulsion of the aircrafts is done by means of gas turbines mechanically coupled to propulsion elements, in particular a fan for a modern dual flow turbomachine, a propeller for a turboprop or a rotor for the turboshaft engines, particularly for helicopter turboshaft engines.

It is known to couple a turbomachine with an electric current generator and an electric motor for driving a thruster, thus forming a propulsion system.

Thus, a direct current propulsion system has been proposed which has a rectifier at the output of an alternative current generator followed by an inverter at the input of an electric motor, in order to output an alternative current at the output of the inverter for the electrical supply of the electric motor.

For such an electrical architecture, the number of energy power sources and electrical loads to be supplied is known, so that the main function of such an electrical supply network is to guarantee the adequate voltage level on the electrical supply network, for example High Voltage Direct Current (HVDC), and to provide the necessary power whatever the demand of the electrical loads to be supplied.

It is known in the architectures of the prior art that the power sources are connected on a distribution bus so as to isolate the failures of one energy power source and thus avoid that the loss of one energy power source from the electrical supply network does not lead to a total loss of the network, which would be very damaging.

A major disadvantage of these networks in which all the power sources are connected to a single distribution bus is that, on the other hand, the occurrence of a failure leading to the loss of the distribution bus itself has the consequence of making the electrical loads that it supplies with energy, in particular the propulsion electric motors, unavailable, which can be detrimental to the flight safety of the aircraft.

It was therefore proposed to segment the electrical supply network and to distribute the power sources and the electrical loads to be supplied over a plurality of distribution buses.

For example, for aircraft electrical architectures of the VTOL type (Vertical Take Off and Landing), it has been proposed that each stator and each rectifier of an electrical machine be connected to a separate distribution bus, in other words, the electrical supply network comprises as many independent distribution buses as there are rectifiers.

Such an architecture allows to segregate the loads, in other words a given actuator is supplied by two separate distribution buses, with the power on a given distribution bus being supplied by a rectifier and a battery.

However, although this electrical architecture allows to segregate the power sources in order to remedy the loss of a distribution bus, it imposes the use of a high number of batteries (in particular, it requires as many batteries as there are distribution buses on the network), which increases its mass and its cost, and the interest of the hybridization is reduced.

The present invention is a simple and effective solution allowing to remedy these disadvantages.

SUMMARY OF THE INVENTION

To this end, the invention relates to an electrical energy supply network of an aircraft provided with a plurality of electrical loads to be supplied, said supply network comprising at least two generators of a turbogenerator of the aircraft adapted to provide a source of electrical energy comprising, each, at least one stator associated with a rectifier, characterized in that the stators of the generators are connected to at least two distribution buses arranged to supply the plurality of electrical loads, and in that it comprises contactors adapted to electrically connect or disconnect the distribution buses from each other.

The electrical network according to the invention has the advantage of being able to segment and distribute the electrical loads to be supplied and the sources of electrical energy in order to protect the electrical network from a risk of failure in the event of a defect on a distribution bus.

According to a first embodiment, by default, the contactors are configured to electrically connect the distribution buses.

Thus, it is possible to multiply the number of sources of electrical energy that can supply the electrical loads to be supplied, the electrical network then being more tolerant to the loss of one or more sources of electrical energy.

According to a second embodiment, by default, the contactors are configured to electrically disconnect the distribution buses.

Thus, in the event of a defect on a distribution bus, the latter is isolated from the rest of the electrical supply network, the latter being partially preserved and able to supply a part of the electrical loads not affected by the failure of the distribution bus. In fact, for an application of the VTOL type, the propulsion assemblies are made up of double star electric machines mechanically driving a propeller. Each star associated with its inverter is connected to a separate HVDC bus. Thus, the failure of an HVDC bus does not lead to the loss of a propulsion assembly.

Advantageously, energy storage means are also connected to the distribution buses.

These energy storage means contribute to the generation and to the stabilization of the electrical supply network by providing a surplus of energy obtained by a hybridization of the electrical supply of the electrical loads to be supplied and in particular of the electric motors.

Preferably and advantageously, the energy storage means are batteries associated with Direct Current/Direct Current converters (DC/DC).

Thus, such a DC/DC converter arranged between the battery and the direct current electrical network allows the electrical network to be stabilized. The addition of such a converter also has the advantage of perfectly controlling, and therefore protecting, the current provided or absorbed by the battery.

Advantageously, the rectifiers of each generator comprise contactors at the level of their input and their output.

Thus, it is possible to electrically disconnect a faulty rectifier from the distribution bus on which it is mounted and isolate it from the rest of the network.

Advantageously, the supply network also comprises contactors at the level of each electrical load to be supplied and of each energy storage device.

Thus, it is possible to electrically disconnect a faulty electrical load or an energy storage device from the distribution bus on which it is mounted and isolate it from the rest of the network.

According to an advantageous example of embodiment, the rectifiers of the generators are alternately connected to the distribution buses.

Thus, in the event of a failure of one of the generators in the electrical network, the impact of this failure is minimized.

Advantageously, the electrical network comprises a centralized control unit for each generator associated with its energy storage device.

Thus, in the case where the contactors are naturally open, the dynamics of a centralized control of the electrical network allows a good management of the power requirement and the voltage stabilization of the distribution buses while increasing the energy efficiency of all the sources. The centralized control also has an advantage when closing the contactors, since it is possible to impose a similar voltage on the two HVDC buses, in order to limit the current peak due to a balancing of the electrostatic energies of the two buses.

On the contrary, a decentralized control does not allow for high control dynamics and high efficiency optimization. However, its main advantage lies in the situation where the contactors are naturally closed. The separation of the two HVDC buses does not prevent the bus voltage from continuing to be regulated, since all the rectifiers work individually.

The invention further relates to an aircraft turbogenerator characterized in that it is equipped with a supply network having any of the above-mentioned characteristics.

Thus, a turbogenerator equipped with such an electrical network allows to guarantee the supply of electrical energy to the electrical loads of the network while giving the possibility of isolating a part of the network which would be affected by a failure.

BRIEF DESCRIPTION OF FIGURES

Further characteristics and advantages of the invention will become apparent from the following detailed description, for the understanding of which reference is made to the attached drawings in which:

FIG. 4 illustrates an example of an embodiment of the electrical supply network according to the invention comprising inductors and resistors between two distribution buses.

DETAILED DESCRIPTION OF THE INVENTION

Figure 1:
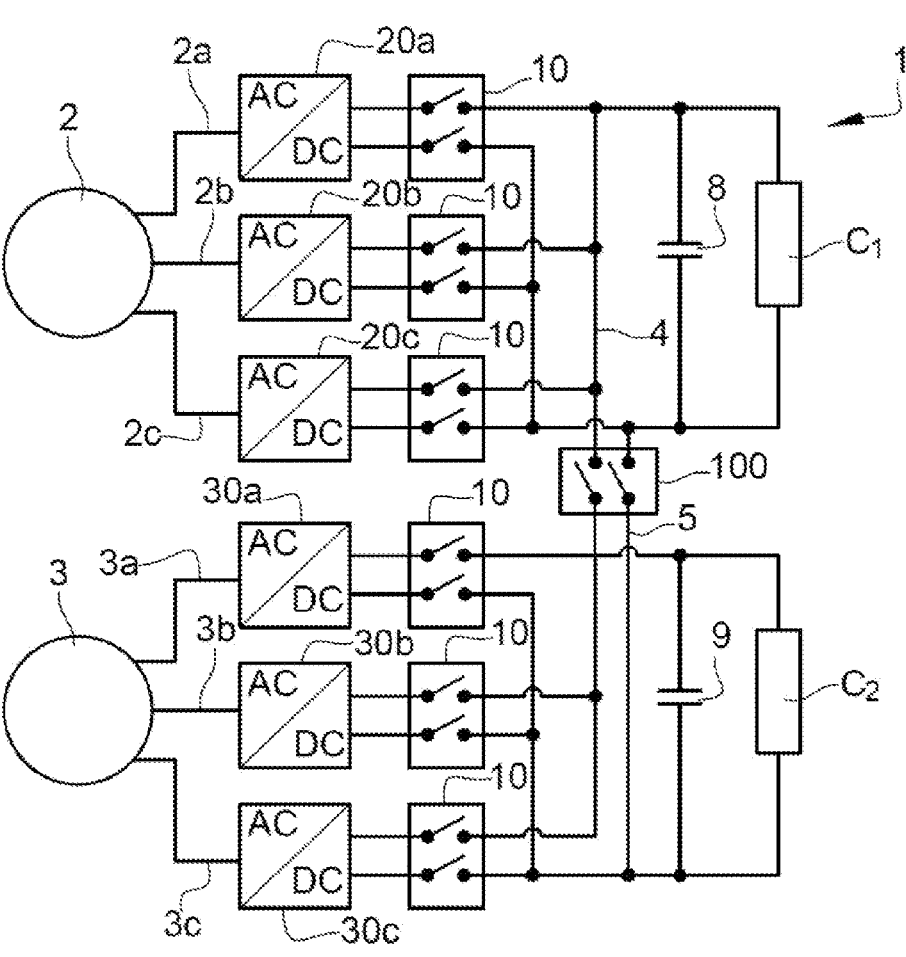
FIG. 1 illustrates an example of an embodiment an electrical supply network according to the invention comprising two generators each comprising three stators mounted in parallel on two distribution buses.
Figure 2:
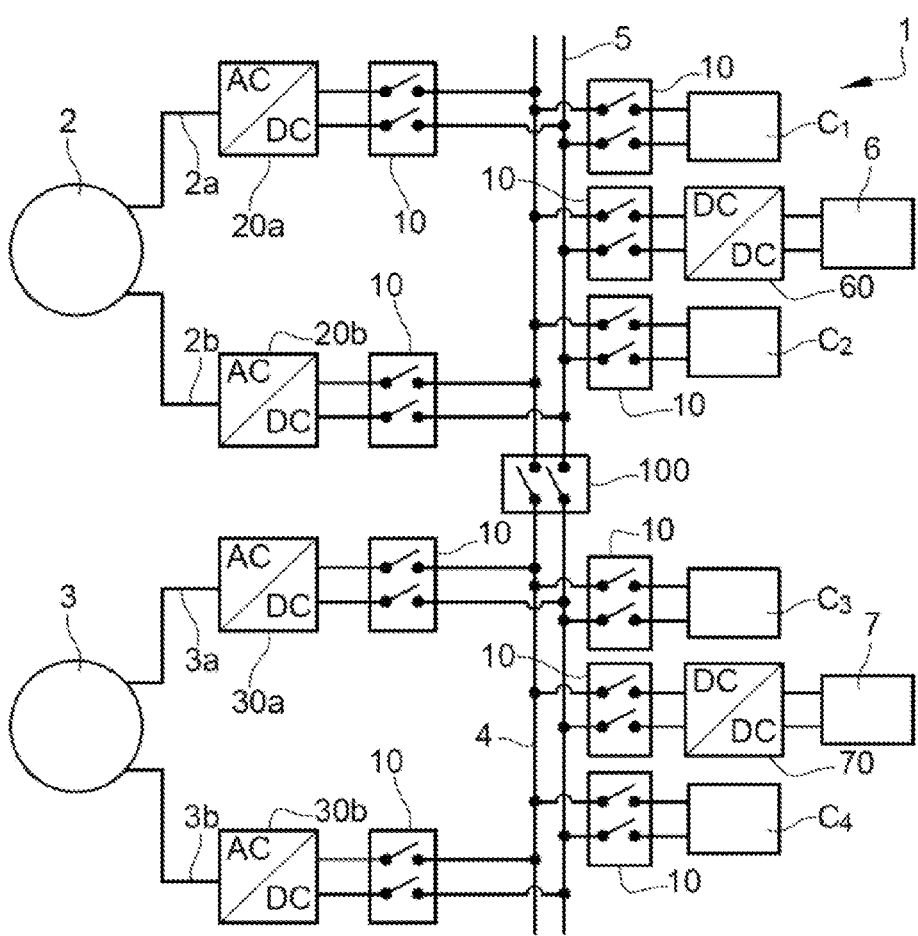
FIG. 2 illustrates another example of an embodiment of an embodiment of an electrical supply network according to the invention, comprising two generators each comprising two stators mounted in parallel on two distribution buses.
Figure 3:
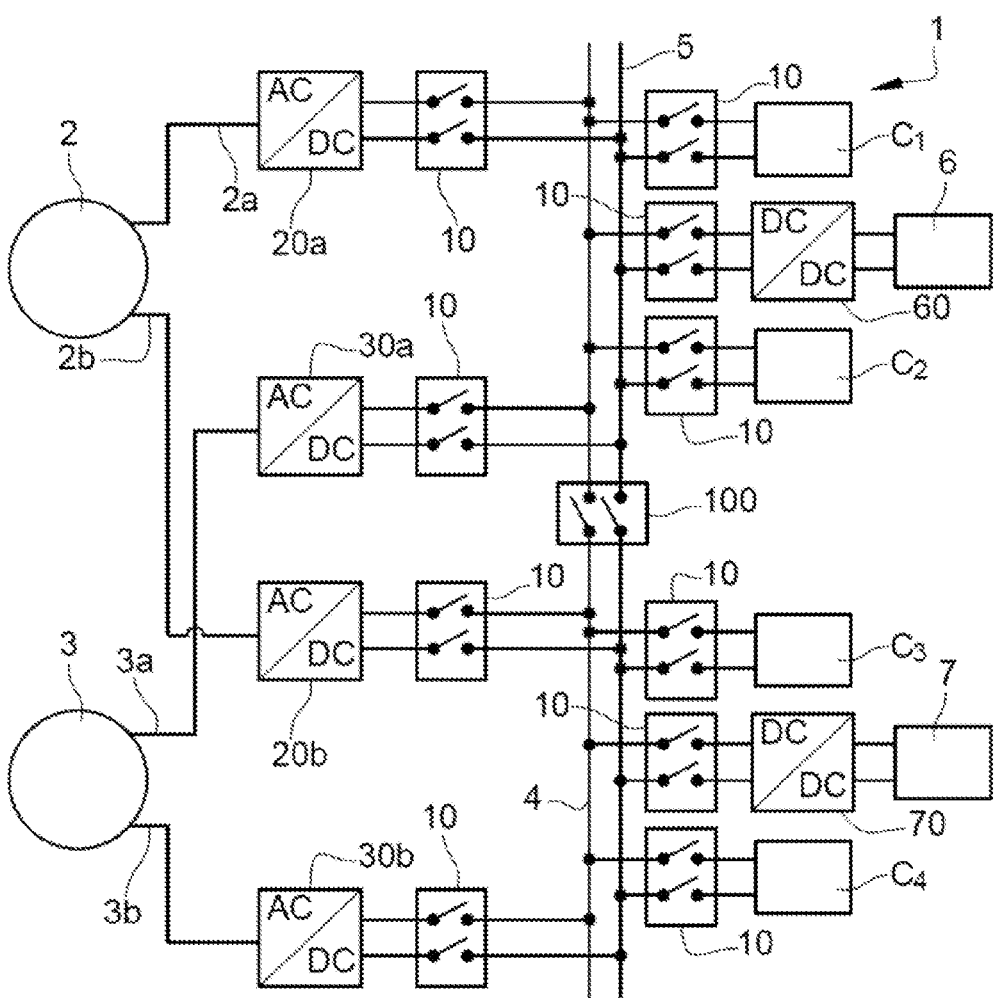
FIG. 3 illustrates a supply network similar to that of FIG. 2, with the rectifiers of the generators crossed on the distribution buses.

With reference to FIGS. 1 to 3, the present invention relates to an electrical energy supply network 1 for an aircraft comprising a plurality of electrical loads C1, C2, C3, C4 to be supplied. These electrical loads are, for example, electric motors associated with inverters and each driving a thruster.

This electrical network 1 comprises an aircraft gas turbine (not shown) mechanically connected to two generators 2, 3 thus forming a turbogenerator assembly. However, the electrical network 1 could comprise more than two generators.

With reference to FIG. 1, and in a non-limiting manner, the generator 2 is a so-called "triple star" or nine-phase generator, in other words it comprises three electrical chains 2a, 2b, 2c connected to electrical loads C1, C2 to be supplied. Each electrical chain 2a, 2b, 2c comprises a stator (not shown) incorporating a set of coils forming a polyphase output element, and a rectifier 20a, 20b, 20c.

Similarly, the generator 3 is a generator and comprises three electrical chains 3a, 3b, 3c connected to electrical loads C1, C2 to be supplied. Each electrical chain 3a, 3b, 3c comprises a stator (not shown) and a rectifier 30a, 30b, 30c.

Each generator 2, 3, could however comprise only one stator, and consequently only one electrical chain, the generator being then called "single star", or two stators as illustrated in FIGS. 2 and 3, known as "double star" generator.

The electrical loads C1, C2, C3, C4 are connected to the generators 2, 3 by means of two direct current distribution buses 4, 5, which is not limiting. The electrical loads C1, C2, C3, C4 can be passive or active loads, such as converters with regulation, for example an inverter and a three-phase motor. For safety reasons, the number of distribution buses is at least two. Indeed, one purpose of the present invention is to be able to isolate a failure that would occur on a distribution bus in order to prevent this failure from propagating to the entire electrical supply network 1.

However, the number of distribution buses can be higher, and at most equal to the number of rectifiers. For weight and cost reasons, it is preferable to minimize the number of HVDC buses, ideally as many as the number of generators.

The electric chains 2a, 2b, 2c and 3a, 3b, 3c, and consequently their respective stators and rectifiers 20a, 20b, 20c, 30a, 30b, 30c, are connected in parallel on the distribution buses 4, 5.

As can be seen in FIG. 3, the rectifiers 20a, 20b and 30a, 30b of the generators 2, 3 respectively, are mounted alternately on the distribution buses 4, 5. In other words, the rectifiers 20a, 20b and 30a, 30b of the generators 2, 3 are crossed on the buses 4, 5. In the case where the HVDC buses are isolated, this configuration has the advantage of not losing all the generation from the turbine on one bus. This allows to minimize the power required from the battery.

More particularly and advantageously, the number of distribution buses of the electrical supply network according to the invention is equal to the desired number of electrical load segregation. Thus, in the illustrated examples, which are by no means limiting, the loads C1, C2, C3, C4 are segregated into two sets distributed on the two distribution buses 4, 5.

With reference to FIGS. 2 and 3, the electrical supply network further comprises energy storage means mounted on the distribution buses 4, 5. These energy storage means are for example electric batteries 6, 7. The energy storage means can be realized other than in the form of batteries and can be, for example, thermal cells or super-capacitors. Such energy storage means allow, in particular, to temporarily supplement a power requirement, in particular when starting up the turbogenerator assembly or during a sudden flight manoeuver requiring power with a very short response time.

In order to improve the supply network 1 by guaranteeing a stability of the electrical supply network 1 and by ensuring the permanent availability of the hybridization possibility of the electrical supply network 1, it is advantageously provided that a DC/DC converter 60, 70, arranged between each battery 6, 7 and the direct current electrical network, is associated with each battery 6, 7.

The electrical supply network 1 also comprises a plurality of contactors 10 associated with the various elements mounted on the electrical supply network 1 and allowing to connect or disconnect these elements to or from the distribution buses 4, 5 to which they are connected and to isolate them when they are faulty in order to prevent such a defect, such as a short-circuit, from propagating to the entire electrical supply network 1.

Thus, each rectifier 20a, 20b, 20c, 30a, 30b, 30c can be disconnected from the distribution buses 4, 5 by means of contactors 10 at the level of their AC input or their DC output.

Similarly, each electrical load C1, C2, C3, C4 to be supplied and each battery 6, 7, by means of their respective inverters 60, 70 where appropriate, can be disconnected from the distribution buses 4, 5 by means of contactors 10.

The electrical supply network 1 according to the invention is in particular noteworthy in that it comprises contactors 100 adapted to electrically connect or disconnect the distribution buses 4, 5 from each other, in other words either the distribution buses 4, 5 are connected to each other or they are isolated from each other.

According to a first embodiment, the contactors 100 are configured to, by default, electrically connect the distribution buses 4, 5 to each other.

This first embodiment has the interesting advantage of being able to multiply the energy sources that can supply the electrical loads of the electrical supply network 1. Indeed, since the various generators 2, 3 and the various batteries 6, 7 of the network 1 are thus shared, the entire network 1 can compensate for a loss of one or more energy sources and continue to supply, in part, the loads C1, C2, C3, C4.

When the distribution buses 4, 5 are linked in this way, it is possible, by means of the contactors 100, to disconnect them in the event of a fault such as a short-circuit on one of the buses 4, 5 so as to prevent such a fault from propagating to the entire network.

Starting from this initial state in which the distribution buses 4, 5 are connected, in other words a state in which the contactors 100 are in a closed state, if a defect occurs on one of the buses 4, 5 requiring a disconnection, e.g. if a short-circuit is detected on one of the buses, the contactors 100 are configured to be able to switch into an open state under a short-circuit current. The contactors 100 are then considered as disconnecting elements.

The use of all these contactors 10, 100, although interesting in order to protect the entire electrical supply network 1, may make the network 1 heavier, which is not desired.

Thus, in an interesting but by no means limiting embodiment, the contactors 100 comprise "pyrofuse" elements, in other words, conductive sections configured to melt when a too high temperature is reached in the cable, corresponding to a too high current flowing through the cable.

According to a second embodiment, the contactors 100 are configured to, by default, electrically disconnect the distribution buses 4, 5 from each other.

This second embodiment has the interesting advantage of being able, by default, to favor the protection of the entire network 1. The distribution buses 4, 5 are thus separated, in other words isolated from each other, so that in the event of a defect on one of the buses 4, 5, such as a short-circuit, the entire electrical supply network 1 is not lost. Therefore, in the event of a short-circuit on one of the buses 4, 5, a part of the electrical loads C1, C2, C3, C4 would continue to be supplied.

When the distribution buses 4, 5 are isolated from each other in this way, it is possible and easy, by means of the contactors 100, to connect them in the event of a specific need for additional electrical energy on a part of the network 1.

Starting from this initial state in which the distribution buses 4, 5 are disconnected, in other words a state in which the contactors 100 are in an open state, if for example one of the batteries 6, 7 does not allow to provide the electrical energy required to supply a part of the electrical loads C1, C2, C3, C4 of the network 1, the contactors 100 are configured so as to be able to switch to a closed state, in order to allow the part of the network presenting this specific need for electrical energy to benefit from another source of supply of the electrical energy.

The present invention thus provides many advantages. It allows the electrical supply network 1 to be segregated, thus preventing a distribution bus 4, 5 from causing a failure in the entire network.

In addition, the possibility of connecting or disconnecting the buses 4, 5 in the initial state or when a defect or a need arises allows for a simplicity in the regulation of the entire electrical supply network 1.

Advantageously, the electrical supply network 1 comprises a control unit (not shown) for the generators 2, 3 and batteries 6, 7, which may be either decentralized or centralized.

In the case of a decentralized control unit, the electrical energy sources, namely the generators 2, 3 and the batteries 6, 7, participate independently in the supply of the electrical supply network 1.

Starting from an initial state in which the contactors 100 are closed so as to connect the distribution buses 4, 5, a disconnection of the buses 4, 5 (in other words, the opening of the contactors 100) is transparent to the control unit, so that no reconfiguration of the control is necessary.

However, the electrical loads C1, C2, C3, C4 such as electric motors driving thrusters of an aircraft not affected by this disconnection must compensate for the energy power requirement. In fact, the detection of a failure such as a short-circuit therefore leads to a change in the operating set point of the electrical loads C1, C2, C3, C4, namely the electric motors supplying thrusters, in order to maintain a flight dynamic of the aircraft. At the same time, a set point of the energy power provided by the gas turbine to the generators 2, 3 must be adapted. The batteries 6, 7 are necessary to intervene during the power transient because the dynamics of the turbine does not allow to follow the electrical dynamics of the motors.

In the case where the distribution buses 4, 5 are initially disconnected, the loss of one or more sources of electrical energy requires the contactors 100 to be closed in order to obtain a connection of the distribution buses 4, 5 in order to mutualize the various sources of energy (generators 2, 3 and batteries 6, 7) over the entire network 1 and to guarantee the power requirement of the electrical loads C1, C2, C3, C4 to be supplied.

However, when the distribution buses 4, 5 are initially disconnected and it is desired to connect them, it is appropriate that a voltage level between the distribution buses 4, 5 is substantially equivalent. Indeed, during the connection of the buses 4, 5, if a voltage difference is present between the buses 4, 5, this can create a current peak when these voltages are rebalanced. This current peak, if it is small, for example of the order of a few tens of amperes, can be absorbed by the network 1, on the other hand, if it is too high, for example of the order of several hundreds of amperes, the current peak cannot be absorbed, which may be harmful to the entire electrical network 1.

However, with such a decentralized control unit, the voltage levels of the distribution buses 4, 5 of the network 1 are not known, so there is a high risk of a current peak occurring when connecting the buses 4, 5. This current peak is due to the rebalancing of the voltages of the two capacitors, this current is limited only by the impedances of the conductive sections.

Figure 4:
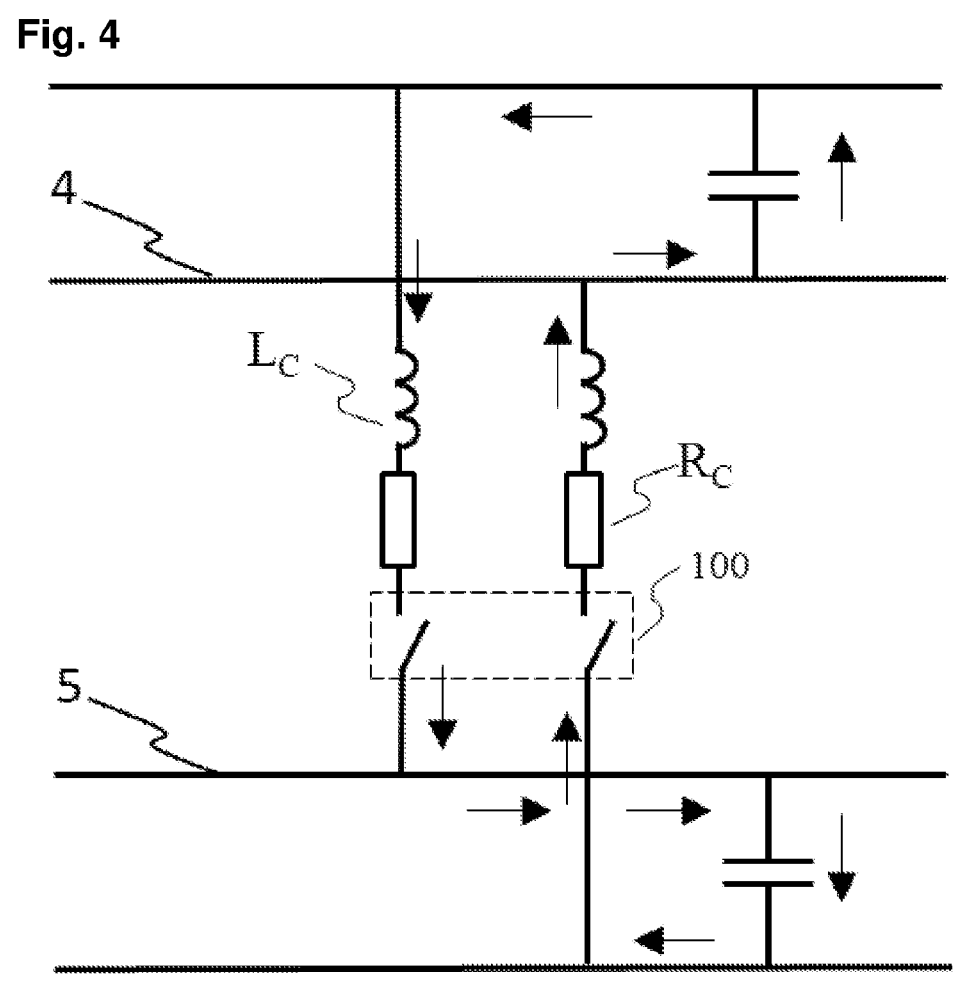

Also, such a current peak can be partially absorbed by the batteries 6, 7. Similarly, the use of super-capacitors 8, 9 on the network allows to better absorb the current peak, but this does not change the detrimental nature of the current peaks and their ability to damage the components. The addition of inductors $L_C$ and resistors $R_C$ between the two HVDC buses 4, 5, as shown in FIG. 4, allows to limit the transient current variations and to dissipate a part of this current as heat.

However, it is necessary to be able to equalize the first and second voltages of the distribution buses 4, 5, or at least have similar voltages, before connecting them.

Thus, according to a second embodiment of the invention, the control unit is centralized, in other words it is possible to intervene on the electrical energy sources of the network 1 in order to regulate the energy power requirements.

Such a centralized control unit comprises means for measuring, on the one hand, a first voltage in a first of the distribution buses 4, 5 and, on the other hand, a second voltage in a second of the distribution buses 4, 5. The centralized control unit further comprises means for driving the converters 60, 70 configured to vary the first voltage and the second voltage.

The centralized control unit has the interesting advantage of being able to act directly on the converters 60, 70 so as to vary the voltages of the distribution buses 4, 5 so that the first voltage and the second voltage are substantially equal. Thus, the risk of a current peak at the connection of the distribution buses 4, 5 is eliminated.

The invention claimed is:

1. An electrical energy supply network of an aircraft provided with a plurality of electrical loads to be supplied, said electrical energy supply network comprising:

at least two generators of a turbogenerator of the aircraft adapted to provide an electrical energy source, each of the least two generators comprising at least two electrical chains, each electrical chain comprising a stator and a rectifier having an AC input electrically connected to said stator and a DC output electrically connected to a rectifier contactor, the DC output of each rectifier contactor electrically connected to one of at least two distribution buses arranged to supply the plurality of electrical loads;

energy storage electrically connected to the at least two distribution buses, wherein the energy storage comprises batteries and converters electrically connected to said batteries;

a plurality of load contactors, at least one load contactor electrically connected between each electrical load of the plurality of electrical loads and the at least two distribution buses and at least one load contactor electrically connected between each converter and the at least two distribution buses, wherein each of the at least two distribution buses is connected to the other through a bus connection circuit, the bus connection circuit comprising an inductor, a resistor and a bus contactor connected in series, the inductor and the resistor being configured to limit the transient current variations and to dissipate a part of this current as heat and the bus contactor being configured to electrically disconnect the at least two distribution buses from each other, and wherein for each one of the at least two generators, each one of the least two electrical chains is connected to a different one of the at least two distribution buses.

2. The electrical energy supply network according to claim 1, further comprising a centralized control unit operatively coupled to the at least two generators and the energy storage means.

3. An aircraft turbogenerator, comprising the electrical energy supply network of claim 1.

4. The electrical energy supply network according to claim 1, wherein the bus contactors are configured to disconnect the at least two distribution buses from each other under a short-circuit current.

* * * * *